UNITED STATES PATENT OFFICE.

WILLIAM DENNIS, OF PROVIDENCE, RHODE ISLAND.

IMPROVEMENT IN COMPOSITIONS FOR SOAP.

Specification forming part of Letters Patent No. 33,339, dated September 24, 1861.

*To all whom it may concern:*

Be it known that I, WILLIAM DENNIS, of the city of Providence, in the county of Providence and State of Rhode Island, have invented a new and useful Improvement in Soap; and I do hereby declare that the following is a full, clear, and exact description of the same.

To enable others skilled in the art to make use of my invention, I will proceed to describe its application to practice.

I first make a white curd-soap in the ordinary way—say, for example, about two thousand (2,000) pounds. I then take one (1) pound of bichromate of potash, dissolve it in six gallons of hot water, and add to the solution five (5) pounds of muriatic acid; and I also take one hundred (100) pounds of palm-oil or tallow-stock and heat it to about 80° Fahrenheit in a vessel of wood or copper, or, if heated in an iron vessel, it should be afterward placed in a vessel of wood or copper, and in such vessel I add to it and stir well into it the above-mentioned solution of bichromate of potash and muriatic acid, after which I let it settle, and then dip off the grease which may be used in making the curd-soap and take the bottoms and throw them over the curd-soap, which still remains in the kettle in which it was made. I also diffuse two (2) pounds of black oxide of manganese in six gallons of cold water, and throw this solution also over the soap, which then requires to be broken up by the mottler to make it pervious in all directions, after which he ceases to push the rake from right to left, and only plunges it perpendicularly till it reaches the lye, when he raises it suddenly in a vertical line, whereby he lifts some of the lye and spreads it over the surface of the paste, through whose numerous channels and fissures it descends to the bottom of the kettle, producing a varied mottling and making a soap which, though of superior quality for all purposes, is especially suitable for washing colored and printed goods, as so far from making the colors run, and so making them cloudy, it fixes them permanently and preserves their brightness.

Having thus described my invention, I claim and desire to secure by Letters Patent—

As an improved article of manufacture, the soap made of curd-soap, bichromate of potash, water, muriatic acid, palm-oil or tallow-stock, and black oxide of manganese, as herein shown and described.

WM. DENNIS.

Witnesses:
JOHN W. SMITH,
ABIATHAR O. HALL.